No. 873,454. PATENTED DEC. 10, 1907.
L. P. NORMANDIN.
CLOTH MEASURING MACHINE.
APPLICATION FILED JULY 25, 1907.
2 SHEETS—SHEET 1.
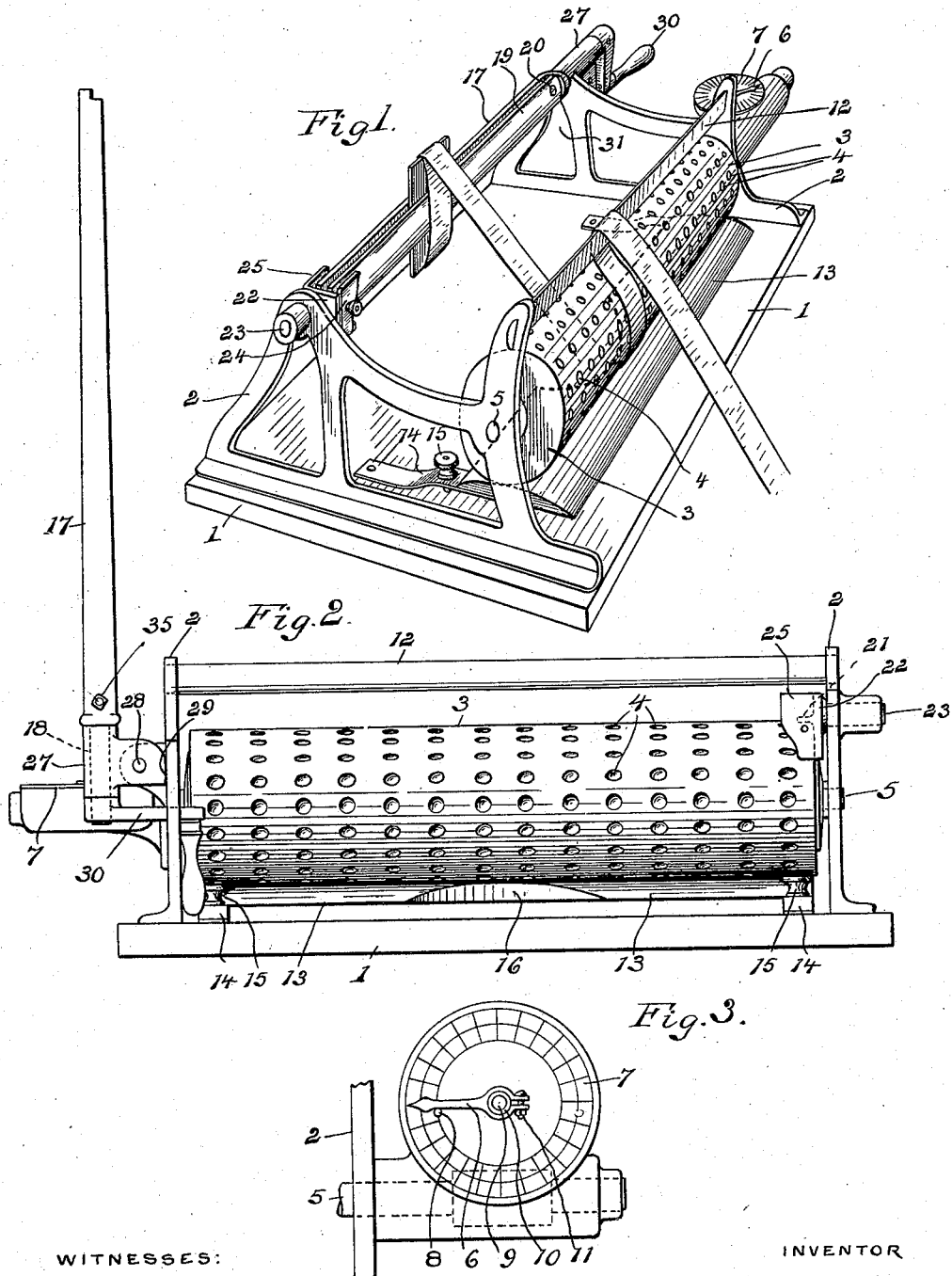
WITNESSES:
Anna M. Dow
Anna M. Mayer
INVENTOR
Levi P. Normandin
By Bartlet & Bartlet
Attorneys.
THE NORRIS PETERS CO., WASHINGTON, D. C.

No. 873,454.
PATENTED DEC. 10, 1907.
L. P. NORMANDIN.
CLOTH MEASURING MACHINE.
APPLICATION FILED JULY 25, 1907.
2 SHEETS—SHEET 2.
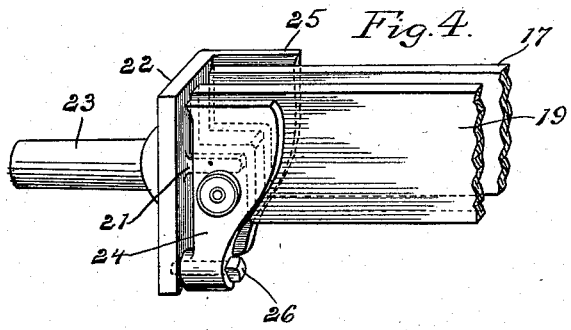
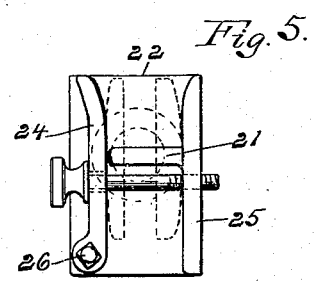
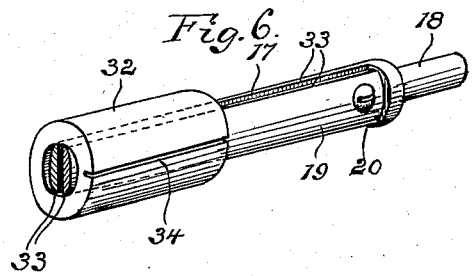
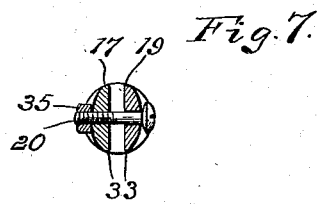
WITNESSES:
Anna M. Dorr.
Anna M. Mayer.
INVENTOR
Levi P. Normandin
By Cauthet & Cauthet
Attorneys.

UNITED STATES PATENT OFFICE.

LEVI P. NORMANDIN, OF JACKSON, MICHIGAN.

CLOTH-MEASURING MACHINE.

No. 873,454.  Specification of Letters Patent.  Patented Dec. 10, 1907.

Application filed July 25, 1907. Serial No. 385,449.

*To all whom it may concern:*

Be it known that I, LEVI P. NORMANDIN, a citizen of the United States of America, residing at Jackson, in the county of Jackson and State of Michigan, have invented certain new and useful Improvements in Cloth-Measuring Machines, of which the following is a specification, reference being had therein to the accompanying drawings.

In measuring and blocking or bolting cloth, ribbon, lace and like fabrics by machine, there is difficulty in quickly and properly starting the material through the machine, and in maintaining thereafter an even tension so that the result recorded is accurate.

This invention relates to a cloth measuring machine wherein the disposition and arrangement of parts greatly facilitates the ready insertion of the material to be measured and whereby an even strain is maintained so that the material is not only properly blocked or rewound but is accurately measured as desired.

The invention consists in the matters hereafter set forth, and more particularly pointed out in the appended claims.

Referring to the drawings, Figure 1 is a view in perspective of a machine which embodies the features of the invention. Fig. 2 is a rear view of the machine showing a bolt-clip raised for reception of a bolt card. Fig. 3 is a detail plan view of the dial and pointer. Fig. 4 is a perspective view of a clip bearing-block. Fig. 5 an elevation of the same; Fig. 6 is a view in detail of a cylindrical card holder. Fig. 7 is a transverse section through the bolt clip.

In the drawings the body of the machine consists of a base 1 on which side frames 2 of suitable design are secured in parallel relation.

A cloth-measuring roller 3 of wood or other suitable material, having a plurality of circular pits 4 in its periphery, is secured by suitable means on a shaft 5 which is horizontally journaled in the frames 2 above the base 1. One of the shaft ends extends through its bearing and is operatively connected, as by properly disposed worm and gear, not shown, or any other like driving mechanism, to an index pointer 6 which revolves above a horizontal index plate or dial 7 having the usual index marks registering the revolutions of the roller periphery in yards and fractions thereof. A stop 8 at the zero of the dial, and a frictional engagement of the index pointer with its actuating spindle 9, as by a bushing 10 of leather or the like, clamped by a set screw 11 closing a split end of the index, enables the operator to move the index quickly back to zero without rotating the roll.

A spreader guide bar 12 of suitable material and proportion is secured above and parallel to the roller, and is so disposed as to give any fabric passed over it and down under the roll sufficient wrap around the roller periphery to prevent slipping.

A slightly rounded bar 13 of suitable material is held tangentially against the under side of the cylinder by spring arms 14 on the base, nuts 15 being provided for regulating the tension, and a notch 16 being cut in the margin of the bar for the hand in pulling cloth through when first starting it.

A clip for holding a bolt card is horizontally journaled in the frames 2 behind and parallel to the roller. This clip consists of a slightly tapered thin spring metal bar 17 having a shouldered journal 18 Fig. 2 formed integrally on one end and a parallel mating bar 19 secured by a cap screw 20 passing through a counter-bored aperture in its inner end, and engaging the bar 17, a jam nut 35 allowing regulation for different thicknesses of cards, and a convex shoulder on the cap screw head allowing ready spreading apart of the bars.

The free ends of the bars are notched or stepped to seat themselves on a stop 21 formed on a clip block 22 provided with a journal 23 engaging a bearing in the frame, said bars being clamped in the block by a jaw 24, pivoted to a fixed jaw 25 integral with the block by a cap screw or bolt 26. The clip block is so disposed as to hang, when free, with its jaws in a perpendicular plane and the upper ends of the jaws are slightly divergent so that the ends of the clip bars readily enter it.

The clip journal 18 is rotatable in a bearing 27 hinged on one of the frames as by a pivot pin or bolt 28, so that the clip may be turned straight up, a shoulder 29 on the bearing engaging the frame and holding the clip upright when so turned. The journal extends through the bearing and a crank handle 30 is secured thereon by proper means. The handle is not counter-balanced and is so disposed that the clip hangs when free with the plane of its bars vertical, so that it is in position to be released from the clip block and turned up. Furthermore, the frame 2 adjacent the handle, is designed to loosely engage the handle when the clip is upturned, and hold the clip from turning, an aperture 31 being provided therefor, under the clip bearing.

In operation, the index is set at zero, and the end of a piece of cloth or like material is passed over the spreading guide and round the roller between it and the tension board. If the cloth is to be wound into the ordinary flat bolt, the clip is turned up and a card of proper shape slipped between the bars, the frame catching and holding the inturned handle to prevent revolving of the clip and the vertical position of the latter allowing the operator to readily center and aline the card. The clip is then turned down, and easily enters the upright jaws of the clip block which always hangs vertically when free in the bearing. The cloth is given a turn around the card, and then may be smoothly wound around it. In case of a ribbon which is usually wound cylindrically, a cylinder 32 of suitable material, taper bored to fit the tapered edges 33 of the bars or jaws, and having a longitudinal slit 34 in its periphery, is slipped onto the jaws of the clip. One end of a piece of card board is inserted in the slit, the board bent around the cylinder and its other end turned into the slit. The ribbon is then rolled on. In either case the bolt or roll may be quickly slipped off when filled. Accurate registry of the length is obtained because of the long wrap around the cylinder and because the circular pits allow the cloth to flatten in spots and grip the edges of the pits so there is no slipping, while at the same time the fabric is not unevenly strained. The tension means feeds the cloth evenly on to the card.

The invention is simple and efficient and may be readily repaired and its worn parts replaced.

Obviously the design and details of construction may be varied without departing from the spirit of the invention, and I do not care to limit myself to any particular form or arrangement of parts.

What I claim as my invention is:—

1. A cloth measuring and blocking machine comprising a main frame, a measuring roller therein, an indicator therefor, a spreading guide bar above the roller, a tension bar yieldingly engaging the periphery of the roll, and a bolt block clip consisting of a pair of pivotally connected parallel spring arms journaled at one end in a frame bearing hinged to swing in a perpendicular plane, and detachably engaged at the other end in a journaled clip block on the frame, and a crank handle for the clip adapted to loosely engage the frame and lock the clip against rotation when the hinged bearing is upturned.

2. A cloth measuring and blocking machine comprising a main frame, a measuring roller therein, an indicator therefor, a spreading guide bar above the roller, a tension bar yieldingly engaging the periphery of the roll, and a bolt block clip consisting of a spring arm provided at one end with a shouldered journal integral therewith, a mating spring arm pivotally secured at one end to the journaled end of the other arm, a clip block adapted to detachably engage and center the free ends of the arms, a bearing in the frame in which the block is journaled, a hinged bearing in horizontal alinement with the block bearing for the arm journal, adapted to swing in a vertical plane, and a crank handle secured on the journaled end of the arms, adapted to loosely engage the frame and to lock the clip against rotation when the hinged bearing is upturned.

3. A cloth measuring and blocking machine comprising a main frame, a measuring roller therein, an indicator therefor, a spreading guide bar above the roller, a tension bar yieldingly engaging the periphery of the roll, and a bolt block clip consisting of a spring arm having a flat inner face, a journal at one end integral therewith, a parallel spring arm having a flat inner face, secured to the journaled end of the other arm by an adjustable pivot bolt, the outer ends of said arms being notched, a journaled clip block having a pair of jaws adapted to detachably engage the free ends of the arms, a stop between the block jaws centering the notched ends in relation to the block journal, a fixed bearing in the frame for the clip block, a hinged clip bearing in the frame alined horizontally therewith, adapted to swing in a vertical plane, and a crank handle secured to the clip, loosely engaging the frame when the clip is upturned.

4. A cloth measuring and blocking machine comprising a main frame, a measuring roller therein, an indicator therefor, a spreading guide bar above the roller, a tension bar yieldingly engaging the periphery of the roll, a horizontal clip block bearing secured in the frame, a clip bearing normally in axial alinement therewith, pivoted to swing in a vertical plane in the main frame, and provided with a stop to hold it perpendicularly when upturned, a clip consisting of a pair of spring arms adjustably secured together at one end to a journal rotatable in the hinged bearing, having parallel faces, and centering notches in their free ends, a clip block consisting of a journal rotatable in the fixed bearing, a fixed jaw secured integrally thereon, a movable jaw clamped thereto by a pivot bolt, and a stop between the jaws adapted to engage the notches in the arm ends and to center them in relation to the journal, said clip block being adapted to hang, when free in the bearing, with its jaws in a vertical plane, and a crank handle secured to the clip adapted to normally hold the clip arms in the vertical plane of the block jaws.

5. A cloth measuring and blocking machine comprising a main frame, a measuring roller therein, an indicator therefor, a spreading guide bar above the roller, a tension bar yieldingly engaging the periphery of the roll, and a bolt block clip consisting of a pair of parallel, spaced tapered arms adjustably secured at one end to a journal rotatable in a vertically tiltable bearing in the frame, and detachably engaged at the other end in a clip block journaled in the frame, a ribbon cylinder having a tapered axial aperture adapted to center said cylinder on the arms and a longitudinal card holding slit in its periphery, and a crank handle for rotating the clip.

6. A cloth measuring and blocking machine comprising a main frame, a measuring roller horizontally journaled therein, a plurality of pits in its periphery, tension means adapted to draw cloth across the pits into engagement with the margins thereof consisting of a horizontal fixed spreader guide bar above and in front of the roller and a horizontal bar yieldingly held in longitudinal contact with the under side of the roller by springs adjustably secured to the base of the frame, a register for the roller, a bolt card clip comprising a pair of parallel spring arms secured at one end to a journal rotatable and tiltable in the frame, and at the other end detachably engaged to a clip block journaled in the frame, and a crank handle for the clip block.

7. A cloth measuring and blocking machine comprising a main frame, cloth measuring means consisting of a cylindrical roller secured on a shaft journaled in the frame, operatively connected to an index pointer held in frictional adjustment over a registering dial, means adapted to prevent slippage of fabric on the roller consisting of circular pits in the roller periphery and a fixed spreading guide bar and an adjustable tension bar yieldingly contacting with the roller, co-acting with the spreader bar to strain the fabric around the larger part of the roller circumference and flatly across the pits, and cloth blocking means, consisting of a bolt clip tiltably journaled at one end in the frame, and adjustably engaged at the other in a clip block rotatable in the frame, adapted to receive and center a roll block, and a crank for operating the clip.

8. A cloth measuring and blocking machine comprising a main frame, cloth measuring means consisting of a cylindrical pitted roller secured on a shaft journaled in the frame, an index spindle operatively connected thereto, an index pointer having a soft friction bushing engaging the spindle, a dial for the pointer having a zero pointer stop, tension means adapted to hold the fabric in close, frictional engagement with the major portion of the roller periphery, and blocking means journaled in the frame adapted to be uptilted therein.

In testimony whereof I affix my signature in presence of two witnesses.

LEVI P. NORMANDIN.

Witnesses:
C. R. STICKNEY,
OTTO F. BARTHEL.